US009878498B2

(12) United States Patent  
Chu et al.

(10) Patent No.: US 9,878,498 B2  
(45) Date of Patent: Jan. 30, 2018

(54) METHOD AND APPARATUS FOR REMOVING SUPPORT MATERIAL

(71) Applicant: Phoenix Analysis and Design Technologies, Inc., Tempe, AZ (US)

(72) Inventors: Kou-Rey Chu, Chandler, AZ (US); Solomon Pena, Tempe, AZ (US); Mark C. Johnson

(73) Assignee: Phoenix Analysis and Design Technologies, Inc., Tempe, AZ (US)

(*) Notice: Subject to any disclaimer, the term of this patent is extended or adjusted under 35 U.S.C. 154(b) by 3 days.

(21) Appl. No.: 14/922,175

(22) Filed: Oct. 25, 2015

(65) Prior Publication Data

US 2016/0325507 A1 Nov. 10, 2016

Related U.S. Application Data

(60) Provisional application No. 62/179,267, filed on May 4, 2015.

(51) Int. Cl.  
*B08B 3/04* (2006.01)  
*B29C 67/00* (2017.01)  
(Continued)

(52) U.S. Cl.  
CPC .......... *B29C 67/0096* (2013.01); *B08B 3/045* (2013.01); *B08B 3/047* (2013.01); *B29C 64/35* (2017.08); *B33Y 40/00* (2014.12)

(58) Field of Classification Search  
CPC ......... B08B 3/045; B08B 3/047; B08B 3/006; B29C 67/0096; B29C 71/0009; B33Y 40/00  
See application file for complete search history.

(56) References Cited

U.S. PATENT DOCUMENTS

| | | | | |
|---|---|---|---|---|
| 769,496 A | * | 9/1904 | Seipelt ............... | A47J 36/20 99/412 |
| 2,205,053 A | * | 6/1940 | Thackeray ......... | G03D 3/02 134/183 |

(Continued)

FOREIGN PATENT DOCUMENTS

| | | | | |
|---|---|---|---|---|
| DE | 102009061069 A1 | * | 6/2011 | ........... C11D 3/2068 |
| JP | 08294681 A | * | 11/1996 | |

OTHER PUBLICATIONS

Abstract: JP08294681A; Imashiro et al., 1996.*

(Continued)

*Primary Examiner* — Mikhail Kornakov  
*Assistant Examiner* — Natasha N Campbell  
(74) *Attorney, Agent, or Firm* — James L Farmer

(57) ABSTRACT

Provided is a method and device for removing chemically dissolvable support material from objects created by a three-dimensional printing process. In one exemplary embodiment a tank for holding a cleaning solution has a cleaning section and a fluid handling section, and a full level below a top rim thereof. A generally box-shaped parts basket configured to be removeably installed within the cleaning section of the tank has four fluid impermeable walls, a bottom panel perforated throughout with an array of holes, and an openable top cover, wherein the openable top cover is below the full level of the tank and the bottom panel of the parts basket is supported above a floor of the tank when the parts basket is installed. A fluid pump disposed in a fluid handling section of the main tank is configured to inject a fluid stream into the parts basket at a downward angle with respect to horizontal, and at a lateral angle with respect to a line passing through a center of the parts basket, with sufficient velocity and flow rate to induce a fluid current that circulates around an interior of the parts basket as it con- (Continued)

tinuously descends and exits the parts basket through the perforated bottom panel.

19 Claims, 12 Drawing Sheets

(51) Int. Cl.
  *B29C 64/35* (2017.01)
  *B33Y 40/00* (2015.01)

(56) References Cited

U.S. PATENT DOCUMENTS

| | | | |
|---|---|---|---|
| 4,870,982 A * | 10/1989 | Liu | B08B 3/12 |
| | | | 134/1 |
| 7,546,841 B2 | 6/2009 | Tafoya | |
| 8,459,280 B2 | 6/2013 | Swanson et al. | |
| 2005/0103360 A1* | 5/2005 | Tafoya | B08B 3/045 |
| | | | 134/18 |
| 2008/0210276 A1* | 9/2008 | Porter | B08B 3/006 |
| | | | 134/198 |
| 2011/0186081 A1 | 8/2011 | Dunn et al. | |

OTHER PUBLICATIONS

Information brochre published by Dimension 3D Printers, Stratasys, Inc., 7665 Commerce Way, Eden Prairie, MN 55344-2020 U.S.A., available online: http://www.capinc.com/wp-content/uploads/2013/09/Dimension-SS-SCA-01-13-web.pdf, Copyright 2010.

* cited by examiner

Nozzle Exit Aspect Ratio = A/B

METHOD AND APPARATUS FOR REMOVING SUPPORT MATERIAL

Provisional Patent Application Ser. No. 62/179,267 to which the present application claims priority, is hereby incorporated by reference.

TECHNICAL FIELD AND BACKGROUND

The technical field of the present invention relates to additive manufacturing, more commonly known as three dimensional printing, or "3D printing", and to the removal of support material from objects created by 3D printing.

3D printing is popular for modeling, prototyping, tooling and production applications. The 3D printing processes build parts layer-by-layer by extruding, jetting, photo-curing, laminating or fusing materials. As parts are built some method of support is required for layers that extend beyond the profile of the previously deposited layer(s) underneath. To support such overhanging layers, the 3D printer forms sacrificial structures underneath using a support material. FIG. 1 shows a simple example, with a 3D printed part 1 atop a printer build plate 2, and support material 3 between the overhanging sides of the part and the build plate. Support material structures are constructed so as to be removable without damaging the actual part, and may be made from the same or a different composition than the part.

An improved process utilizes support materials that are soluble and eventually dissolve when placed in a bath containing a water-based mild alkaline solution. There are currently a number of commercially available cleaning bath systems designed to chemically remove soluble support material. These systems use methods that rely on various wet cleaning processes and techniques but do not remove the support material effectively. The processes used include for example spraying, mechanical agitation, ultrasonic excitation, and uncontrolled water circulation.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
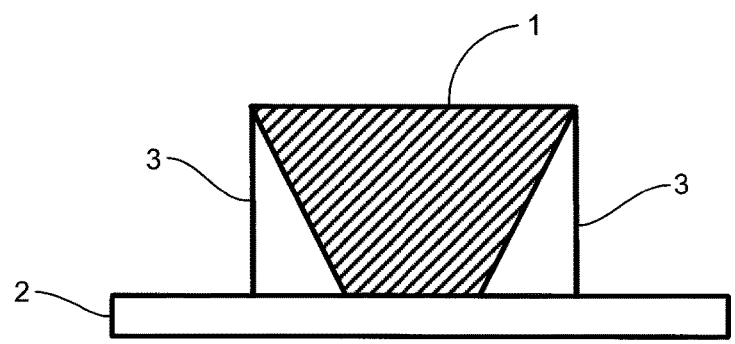
FIG. 1 is a schematic representation of a 3D printed part on a build plate with support material beneath overhanging portions of the part.
Figure 2:
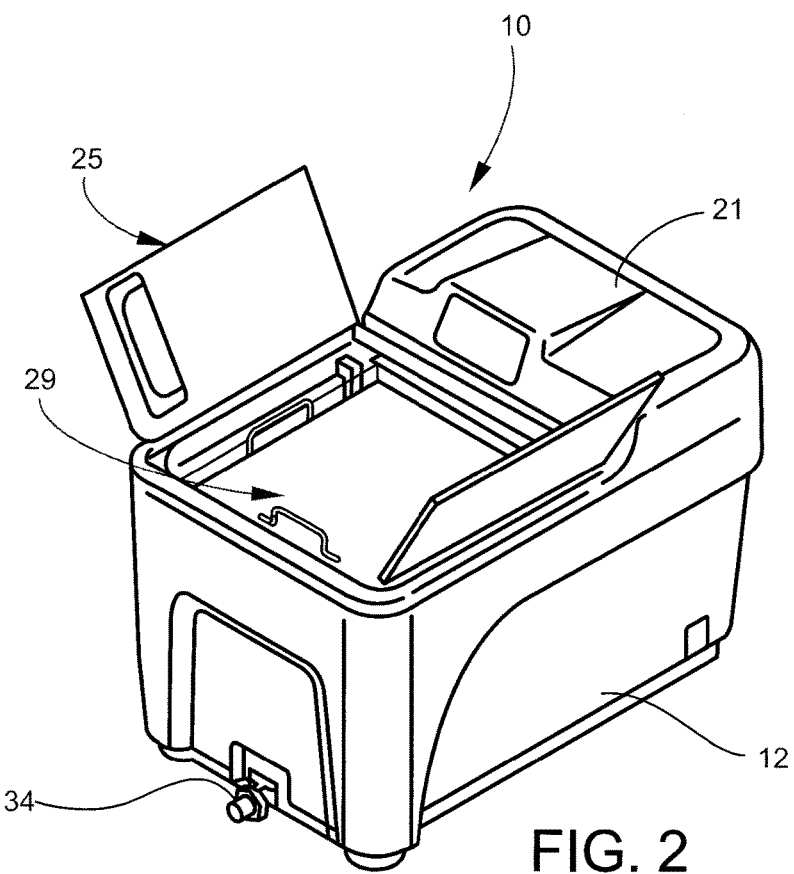
FIG. 2 is a perspective view of an exemplary 3D printed parts cleaner in accordance with the present disclosure.
Figure 3:
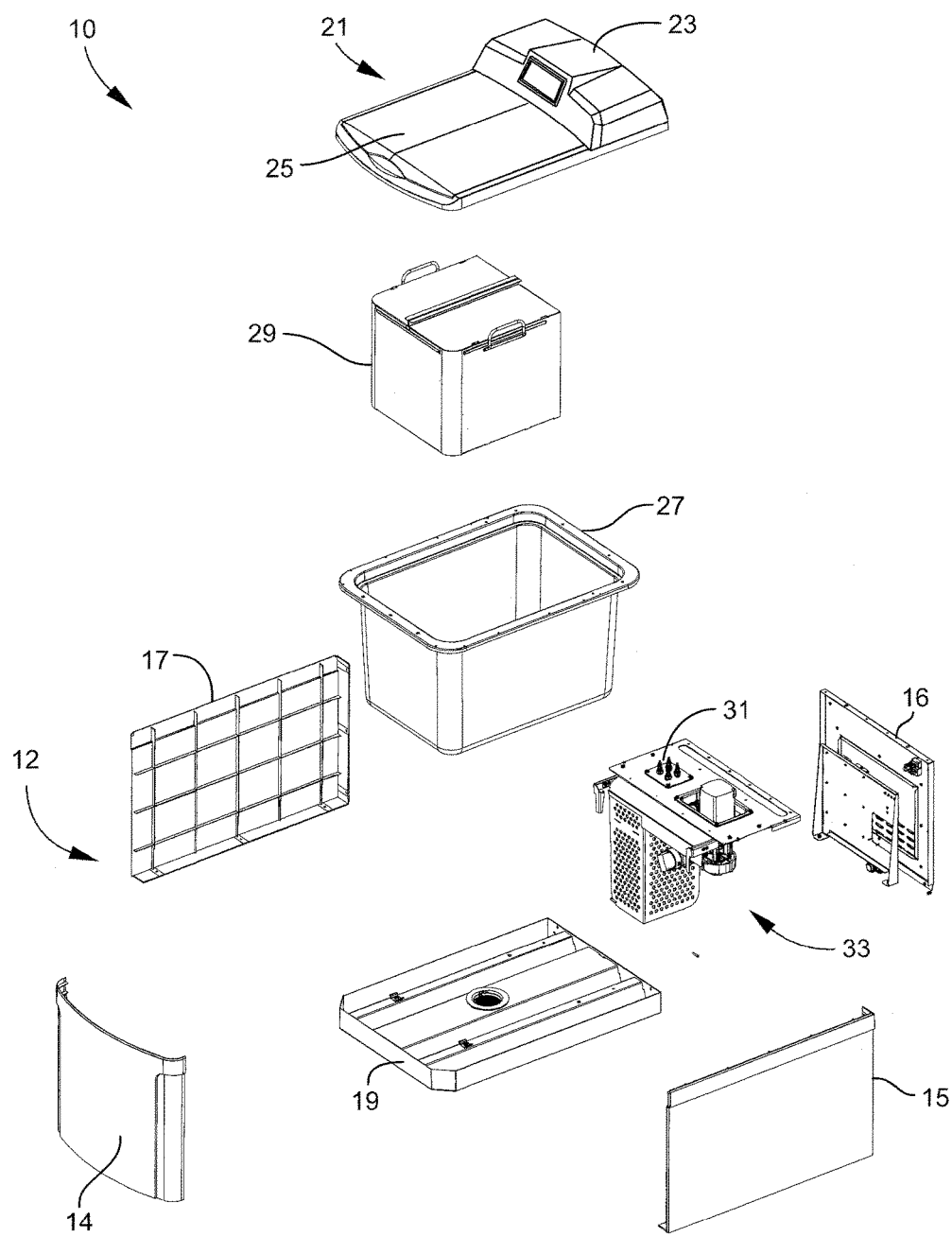
FIG. 3 is an exploded perspective view of the parts cleaner of FIG. 2.
Figure 4:
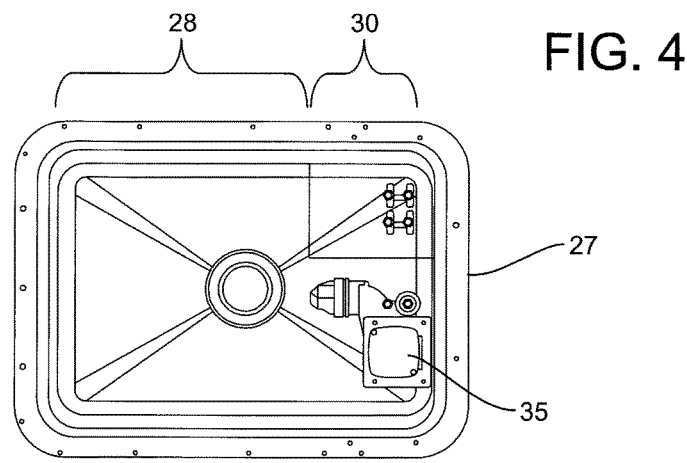
FIG. 4 is a top view of the tank portion of the parts cleaner indicating the cleaning and fluid handling sections of the tank.

Referring now initially to FIGS. 2 through 4, an automated cleaner for removing dissolvable support material is indicated at reference numeral 10. The cleaner 10 comprises an outer cabinet 12 with front and back panels 14, 16, right and left side panels 15, 17, a bottom 19, and a top 21 that includes a display and control housing 23 and a lid 25. The lid 25 may have left and right halves hinged along their outer edges to top edges of the cabinet side panels 15, 17, and configured to open outward to the left and right as shown. The lid 25 opens to a large watertight tank 27 that substantially conforms to the available space inside of the outer cabinet 12. The inside of the tank 27 is divided into a cleaning section 28 containing a removable parts basket 29, and a fluid handling section 30 that includes heating elements 31 and a pump assembly 33.

In operation the tank 27 is filled substantially to the top with a heated, water based cleaning solution specifically formulated to chemically remove the dissolvable type support material. The size of the tank is substantially maximized for a given cabinet configuration to maximize the time before the cleaning solution becomes ineffective due to saturation with the dissolved support materials. In one embodiment the tank has a 27 gallon capacity. Once the cleaning solution has become saturated, the tank may be drained and cleaned to remove and replace the cleaning solution using a tank drain valve 34 located at the front or back of the cabinet. The valve may include a barbed outlet that permits the secure attachment of a hose for draining.

User control of cleaning times and temperatures is performed using push button controls and digital displays of the display and control housing 23. A built-in microprocessor controller regulates and controls cleaning times and cleaning solution temperatures, as well as performing safety functions to alert the user of problems, and if necessary halt a cleaning operation until the problems are resolved.

Two means, or levels are provided for protecting against an over temperature condition of the cleaning solution. In the first level, the microprocessor system attempts to shut off power to the heater and alerts the user with visual and audible annunciators. A second level of protection is provided by a thermal cutout (TCO) mounted to the tank. The TCO operates independently of the microprocessor, and if the first level of protection fails, or goes unnoticed, the TCO will trip and remove power to the heater to prevent damage to the cleaner or risk of a fire.

To prevent spills or splashing of the cleaning solution, or damage to the pump and heaters, the level of the cleaning solution in the tank is monitored by the microprocessor electronics. In one embodiment a float sensor detects high or low solution levels, which then signals the microprocessor the level status. If high or low levels are detected, an appropriate visual annunciator will flash, an audible alert will beep, and the operation of the cleaner will be halted.

Figure 5:
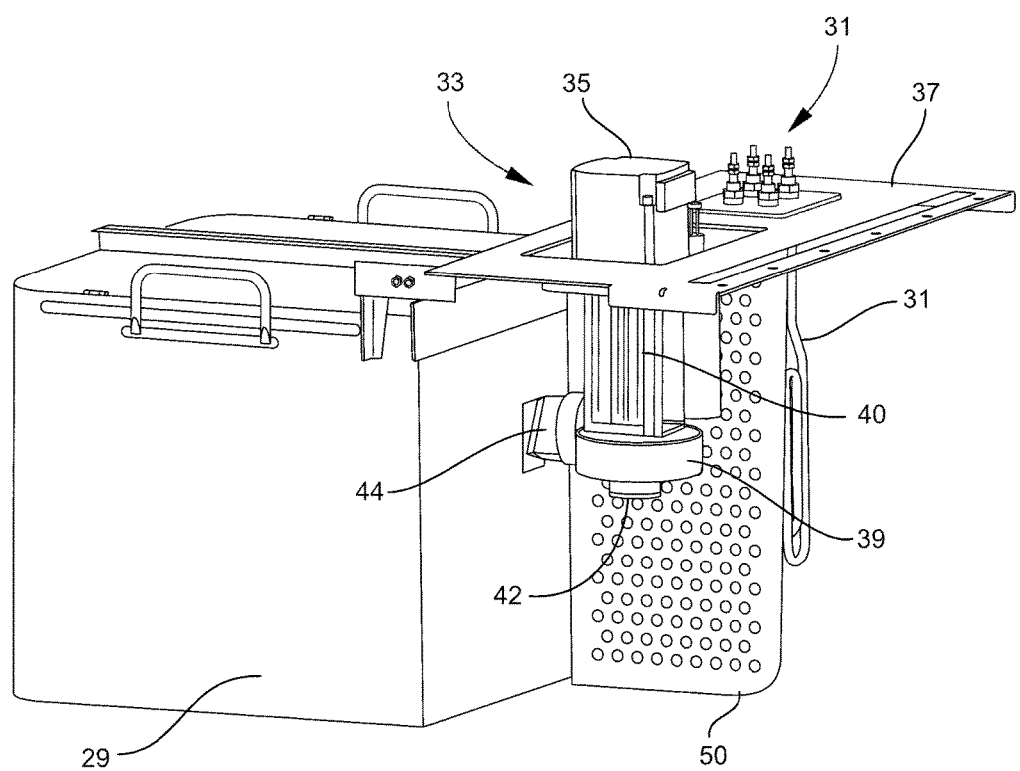
FIG. 5 is a perspective view of the contents of the tank during a cleaning process, including the pump assembly, heating elements, and the parts basket.
Figure 6:
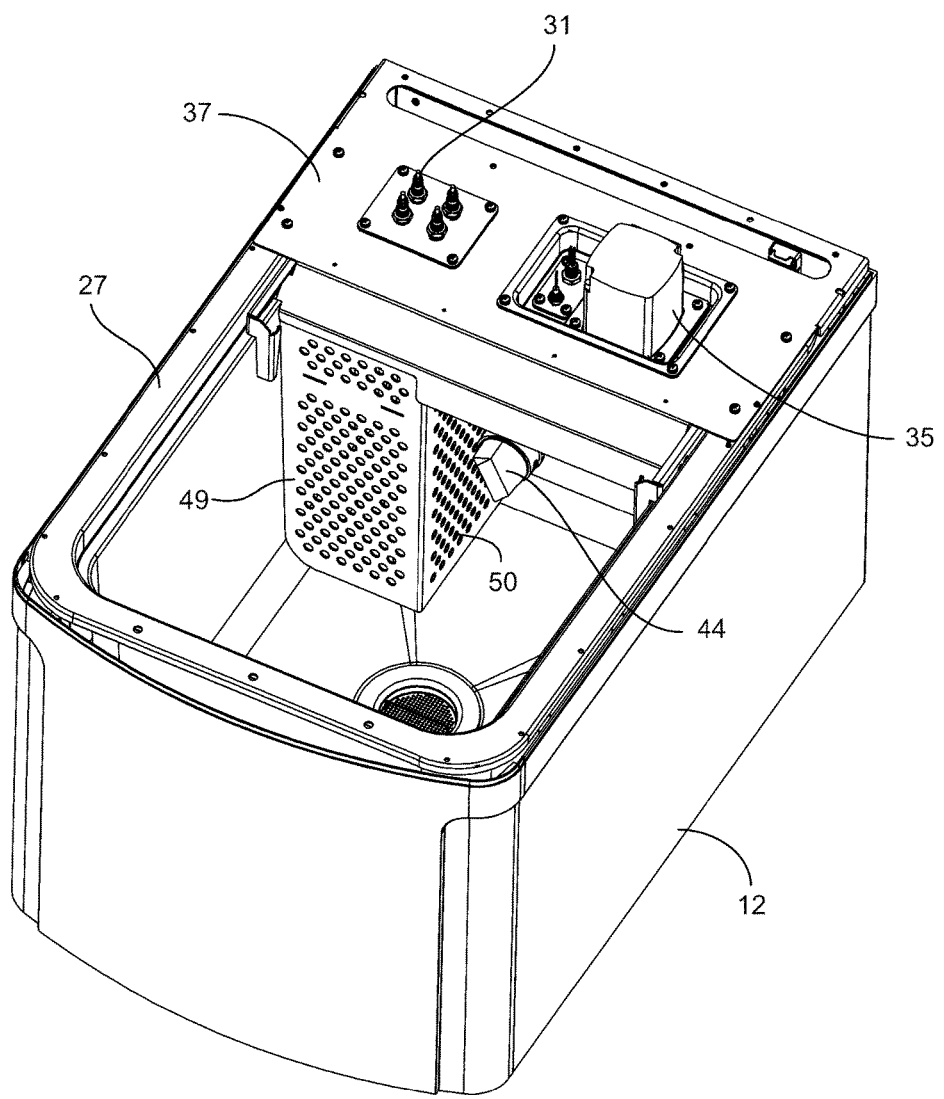
FIG. 6 is a top perspective view of the parts cleaner showing the contents of the fluid handling section.

Referring now also to FIGS. 5 and 6, the pump assembly 33 includes a motor 35 supported by a baffle plate 37 and connected to an impeller type pump 39 by a drive shaft 40. In operation the pump 39 is submerged in the cleaning fluid that fills the tank 27, and the motor 35 is positioned above a full level of the fluid. The baffle plate 37 together with the top 21 create a sealed compartment that isolates the motor 35 from corrosive vapors produced by the heated cleaning fluid. The pump 39 draws in fluid from underneath through an intake 42, and discharges fluid at a predetermined velocity, flow rate, and direction through an injection nozzle 44 aimed at an opening 46 in a side of the parts basket. The heating elements 31 are also attached to the baffle plate 37, and extend downward into the tank. The heating elements are normally submerged in cleaning fluid when the tank is full, and may be partitioned in one side of the fluid handling section 30 behind porous dividers 49 and 50 as best seen in FIG. 6.

Figure 7:
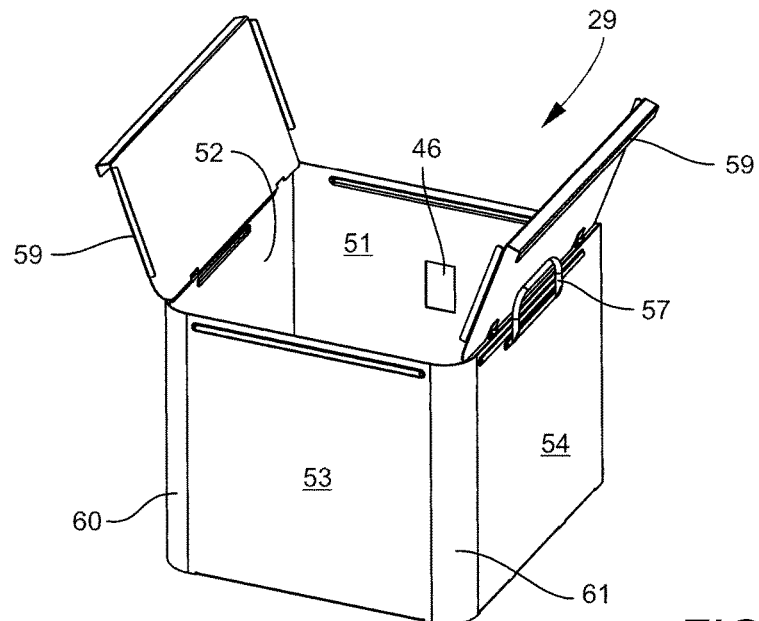
FIG. 7 is a top perspective view of a parts basket in accordance with the present disclosure in which the top cover is a split configuration.
Figure 8:
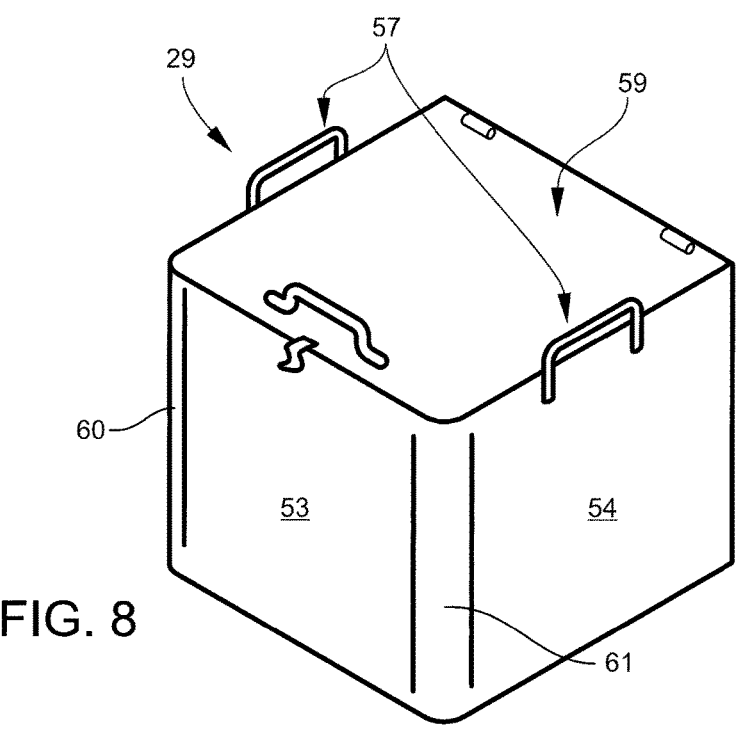
FIG. 8 is a top perspective view of another embodiment of the parts basket with a one piece top cover.
Figure 9:
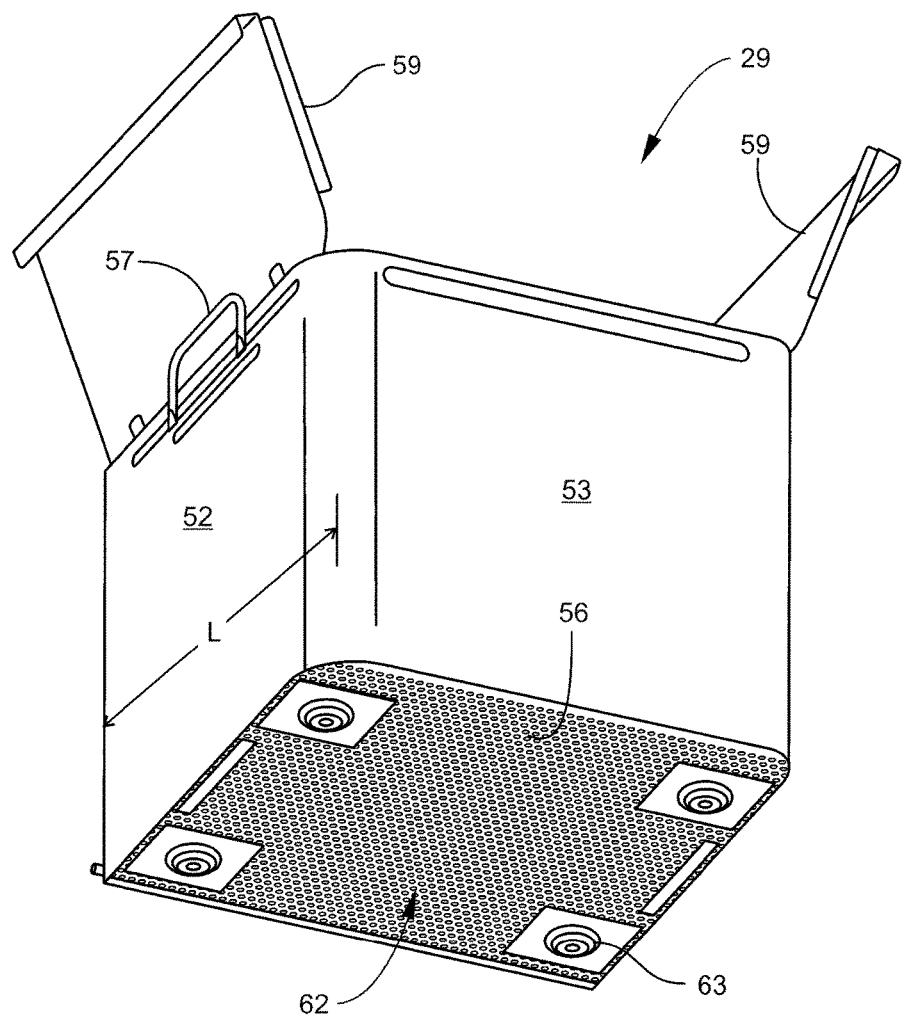
FIG. 9 is a bottom perspective view of the parts basket of FIG. 7 showing the perforated bottom panel and the spacers that support the parts basket on the floor of the tank.

Referring now to FIGS. 7 through 9, the parts basket 29 is a box made of a corrosion resistant material such as stainless steel, with back and front walls 51, 53, left and right side walls 52, 54, a bottom panel 56, handles 57, and a hinged top cover 59. The top cover 59 may be a split configuration like that shown in FIG. 7, or a one-piece design like that shown in FIG. 8. Because of its simplicity the one piece design may be preferable for relatively small parts baskets that may be easily opened with one hand. However for larger baskets that result in a difficult reach for a user to open the cover and monitor parts being cleaned, the split configuration may be preferable because the user's arms are conveniently directed away from heated vapor generated by the cleaning solution.

The bottom panel 56 of the parts basket is perforated throughout with an array of substantially evenly distributed holes 62 (see FIG. 9), whereas except for the opening 46, the walls 51-54 and the hinged cover 59 are solid (or not perforated). Thus, when the cover is closed, the only substantial exit for fluid injected into the parts basket through opening 46 (ignoring any back flow through opening 46) is through the holes 62 in the bottom panel 56. The quantity, size, and spacing of the holes 62 is selected to encourage and facilitate a dynamic circulating fluid flow through the parts basket. In one embodiment the holes 62 account for between 15 and 60 percent of the total surface area of bottom panel 56; and in a more particular embodiment the holes 62 account for approximately 20 percent of the total surface area of panel 56.

The inventors have further discovered that the desired dynamic circulation of the fluid in the parts basket can be enhanced by rounding the corners, and in particular the front corners 60, 61 at the intersections of the front wall 53 and side walls 52, 54. By rounding at least the two front corners, a fluid current that enters the parts basket through the back wall 51 is redirected at least twice in an efficient manner, substantially completing at least one loop around the inside of the basket, and thereby encountering all of the parts in the parts basket at least once before exiting out the bottom panel 56. The amount of corner curvature is selected to efficiently turn the fluid current without resulting in significant turbulence, and is related to the geometry of the parts basket, and the velocity or momentum of the fluid stream entering the parts basket. In relation to the dimensions of the parts basket, the corner curvature may be described as a ratio of the radius of curvature of the corner to the length of the walls, or:

$$CR=r/L$$

where "CR" is the curvature ratio; "r" is the radius of curvature of the front corners; and "L" is the corner-to-corner wall length of a square parts basket (see FIG. 8). For example, in one preferred embodiment a suitable curvature ratio (CR) is at least 0.1. In another preferred embodiment the curvature ratio is in a range of between about 0.1 and 0.3., and in yet another more specific embodiment the ratio is about 0.17. An example of the latter is a square parts basket with L=12 inches, and r=2 inches.

Figure 10:
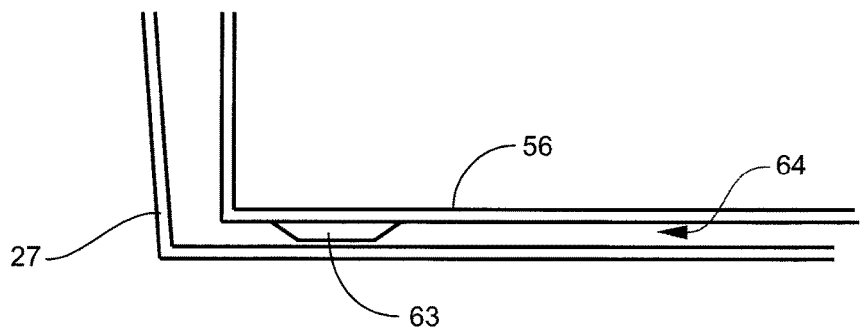
FIG. 10 is a cross section of a corner portion of the tank and the parts basket showing a fluid return gap created by the spacers.

With the cabinet lid 25 open, the parts basket may be lowered into the tank using handles 57 until it rests on the bottom of the tank in a parts cleaning position, as shown for example in FIGS. 2 and 10. The entire parts basket is submerged in this position when the tank is filled with cleaning fluid, including the cover 59 which is also below the full level of the fluid. The parts basket may be restrained in the cleaning position with an optional latch or lock device (not shown), or in the case of a metal parts basket, gravity alone may be sufficient to prevent it from floating up off the bottom of tank 27 during a cleaning process. Localized spacers 63 may be provided under bottom panel 56 at each corner to act as stand-offs, and create a fluid return gap 64 (see FIG. 10) between the parts basket bottom 56 and the bottom of the tank 27. The fluid return gap 64 provides a pathway for fluid exiting the bottom of the parts basket to return to the pump 39, and is preferably large enough to avoid causing a flow restriction under operating conditions. In one embodiment the gap 64 is between about 0.3 and 1.0 inches, and in a more specific embodiment the gap is about 0.5 inches.

Figure 11:
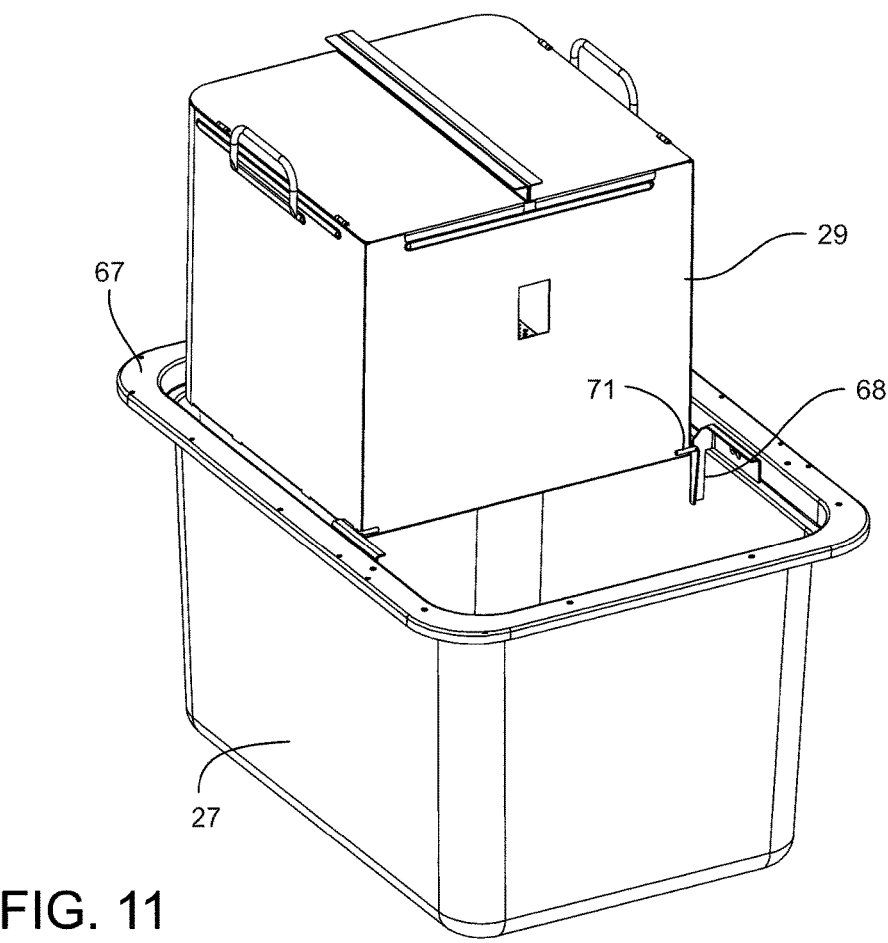
FIG. 11 is a top perspective of the tank and parts basket, with the parts basket supported atop the tank in the draining position.
Figure 12:
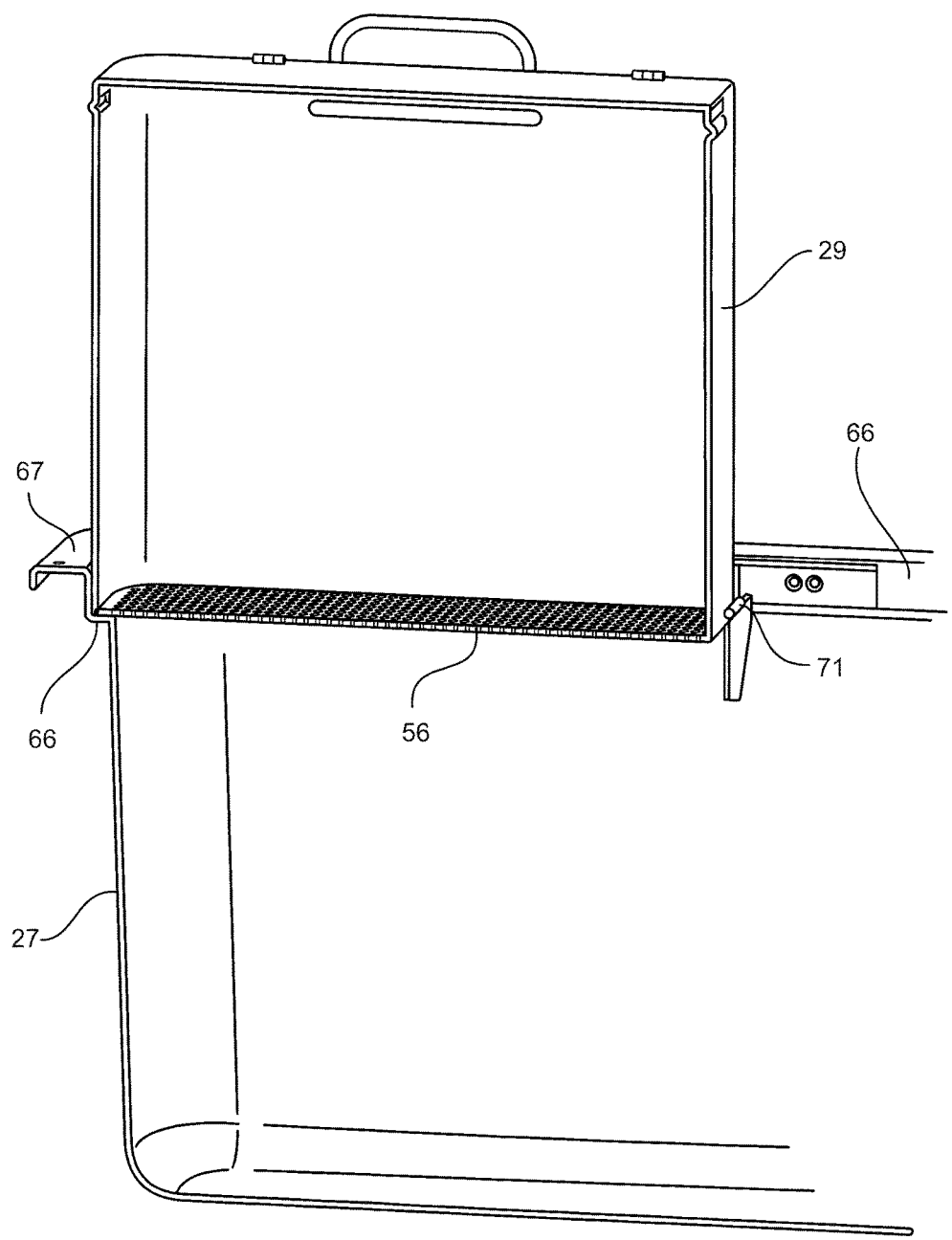
FIG. 12 is a cut-away side view of the parts basket and tank of FIG. 11, showing the lower shelf of the tank rim supporting the front of the basket, and the notched flange that supports the back of the parts basket.
Figure 13:
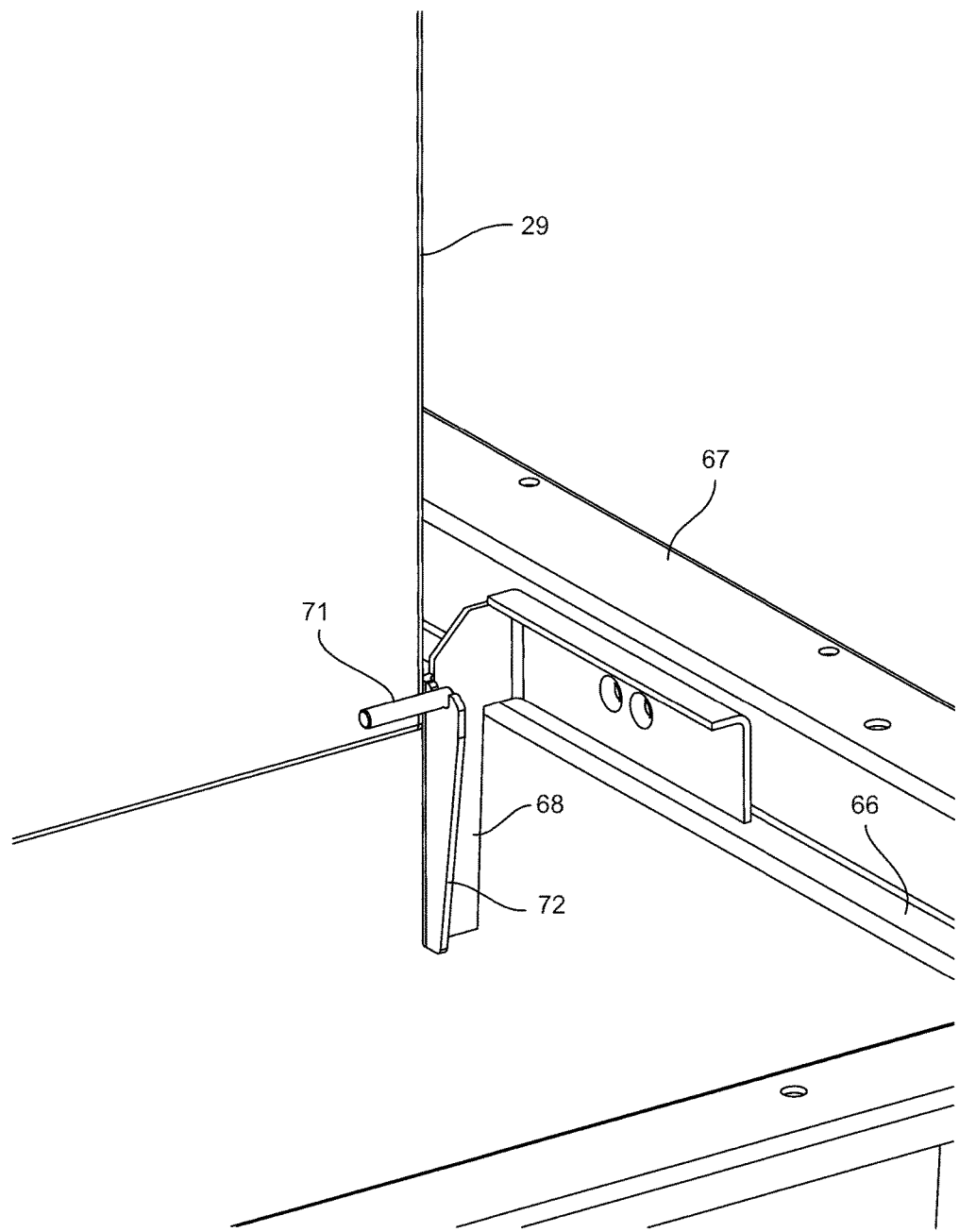
FIG. 13 is a close up perspective view of a notched flange supporting the back of the parts basket via the integral pegs extending from the parts basket.

The parts basket may be manually lifted out of the tank during or after a parts cleaning process using the handles 57. Once lifted out it is typically desirable to hold the parts basket directly above the tank long enough for all of the cleaning fluid to drain out. To avoid requiring a user to physically hold the parts basket, the parts cleaner is equipped with built-in support features near the top of the tank that are configured to temporarily support the parts basket above the cleaning fluid as shown in FIGS. 11 through 13. In particular, a lower shelf 66 of an upper rim 67 of the tank 27 serves as a support for the front of the parts basket, while a pair of flanges 68 attached to the sides of the tank support the back of the parts basket. Each flange 68 is configured with a notch 69 to receive and support integral pegs 71 that extend from the back of the parts basket. A tapered lead-in portion 72 guides the pegs around and over the flange 68 to the notch 69 as the parts basket is lifted out of the tank. The support features thus provide a stable and secure means for holding the parts basket in an optimal draining position over the tank.

The inventors have discovered that removal of the dissolvable support material from 3D printed parts is substantially dependent upon the dynamic condition of the cleaning fluid as it interacts with the parts. More specifically, the inventors have discovered that support material removal is significantly enhanced when the parts are submerged in a dynamic, controlled flowing current of fluid, as compared to prior art cleaning systems that utilize various fluid spray or uncontrolled fluid agitation schemes. In the present invention, a dynamic, flowing vortex current is created and maintained within the submerged parts basket by injecting a carefully engineered fluid stream at a predetermined flow rate, velocity, and direction.

The pump 39 and nozzle 44 are configured to discharge a fluid stream toward the opening 46 in the back wall 51 of the parts basket. The nozzle is positioned close enough to the parts basket, the opening 46 is large enough, and the fluid velocity is high enough so that substantially all of the fluid discharged from the nozzle goes through the opening and into the parts basket. The position of the opening 46 in the back wall 51 is selected to optimize the cleaning effectiveness of the desired spiraling fluid current down through the parts basket. In one exemplary embodiment the opening is approximately at the lateral, or horizontal center of wall 51, and vertically at or above the middle of the wall. In another more particular embodiment, the bottom edge of the opening is above the vertical center of the back wall 51 by an amount in the range of approximately zero to two inches.

Figure 14:
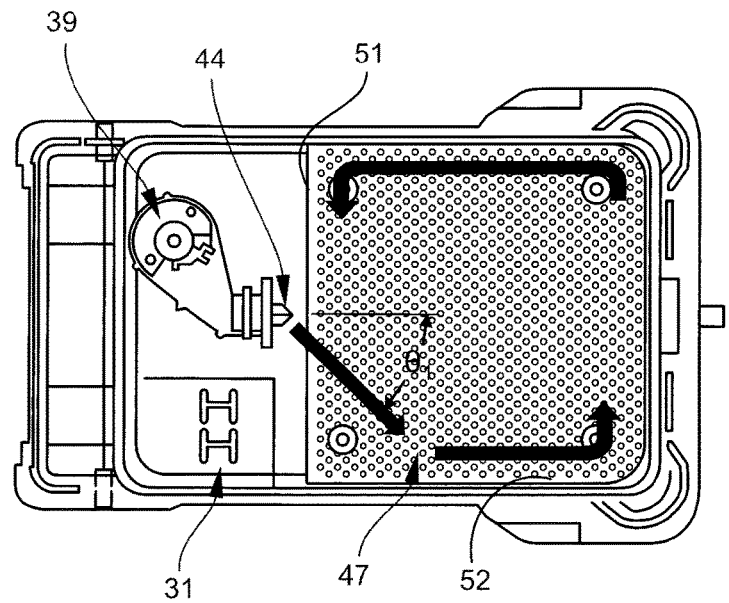
FIG. 14 is a schematic bottom view of the parts cleaner showing the lateral fluid injection angle and the induced circulating current.
Figure 15:
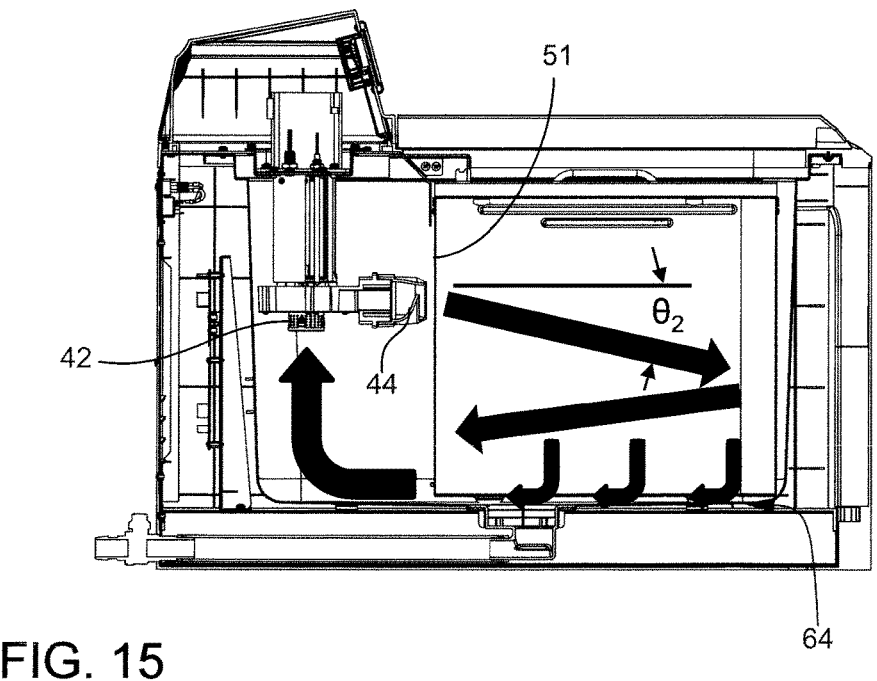
FIG. 15 is a schematic side view of the parts cleaner showing the downward fluid injection angle and the fluid circuit that begins and ends at the fluid pump.

The path that the fluid current takes through the parts basket is represented schematically with arrows in FIGS. 14 and 15. The fluid follows a circuit best seen in FIG. 15, flowing first from nozzle 44 into the parts basket, spiraling downward and finally out through the bottom panel 56, then through gap 64 between the parts basket and the tank bottom, and finally back to the pump intake 42. The direction of the fluid stream entering the parts basket through the opening 46 is determined by the nozzle 44, and as can be seen, the fluid stream is not injected straight into the parts basket, or in other words not on a line passing through the middle of the parts basket. Instead the nozzle directs the fluid somewhat tangentially, at an angle in both the lateral and vertical directions.

Referring first to the top view of FIG. 14, the fluid may be injected at a lateral angle $\theta_1$ to a line passing through the center of the parts basket (or more conveniently, "centerline"). The lateral angle directs the fluid stream initially toward side wall 52, where it is redirected and forced to follow the walls around the inside of the parts basket as shown by the arrows 47. The injected fluid stream in turn induces a circular vortex flow pattern that involves substantially all of the fluid in the parts basket at any given time.

To encourage the circulating flow down and out through the bottom of the parts basket, the direction of the injected fluid stream also includes a downward component, indicated at $\theta_2$ in FIG. 15. The amount of the lateral and downward angles are selected to create a descending spiraling, substantially non-turbulent fluid current that completes at least one loop around the inside of the parts basket before exiting out the bottom panel 56. Too much turbulence disrupts the flow and introduces the possibility of splashing in the basket, or can cause damage to delicate parts. In one embodiment the lateral angle of the injected stream $\theta_1$ is between about 30 and 65 degrees, and the downward angle $\theta_2$ is between about 10 and 20 degrees. In another more specific embodiment, the lateral angle $\theta_1$ is about 45 degrees, and the downward angle $\theta_2$ is about 15 degrees.

Figure 16:
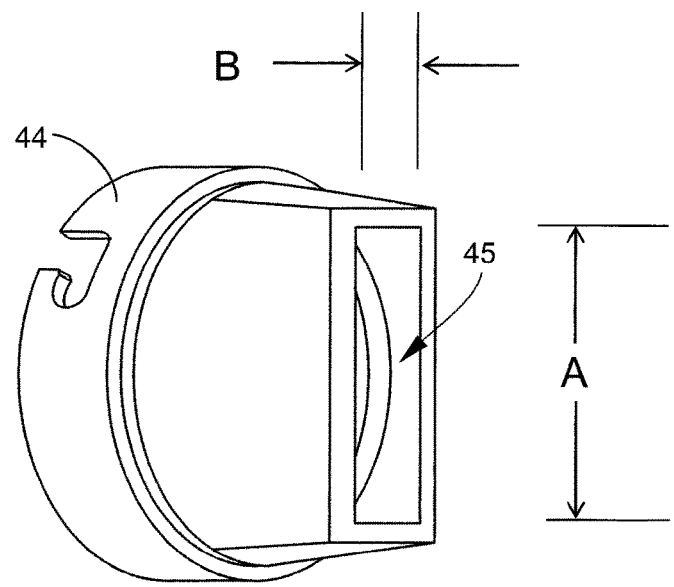
FIG. 16 is a perspective front view of one embodiment of the pump nozzle showing relative dimensions of the nozzle exit opening.

The ability of the injected fluid stream to create and maintain the desired flow circulation may be further enhanced by providing the nozzle exit opening 45 with a vertically elongated shape. A vertically elongated shape allows for a wide (vertically) uniform fluid stream with optimal flow rate and velocity without introducing turbulence. The vertically elongated fluid stream also advantageously tends to hug the walls of the parts basket, and thereby maximize inducement of the desired circulating current. Referring to FIG. 16, the depicted nozzle exit is substantially rectangular, with a height "A" of the exit opening being several times greater than a width "B". In one embodiment the aspect ratio of the nozzle exit, defined as A divided by B, falls within a range of about 3.5 to 5.5. In a more specific embodiment the aspect ratio is about 4.7.

Figure 18:
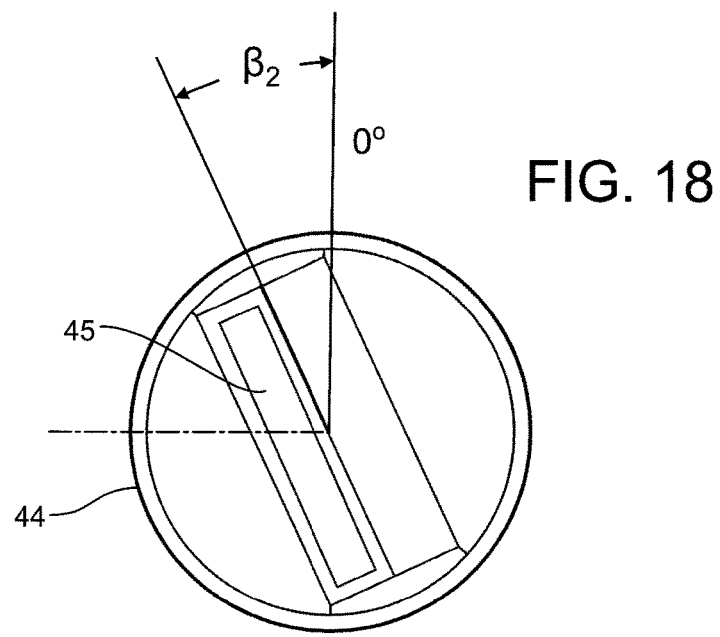
FIG. 18 is a front elevation of the nozzle of FIG. 16 showing the rotation angle that creates a downward component of the fluid injection angle.
Figure 17:
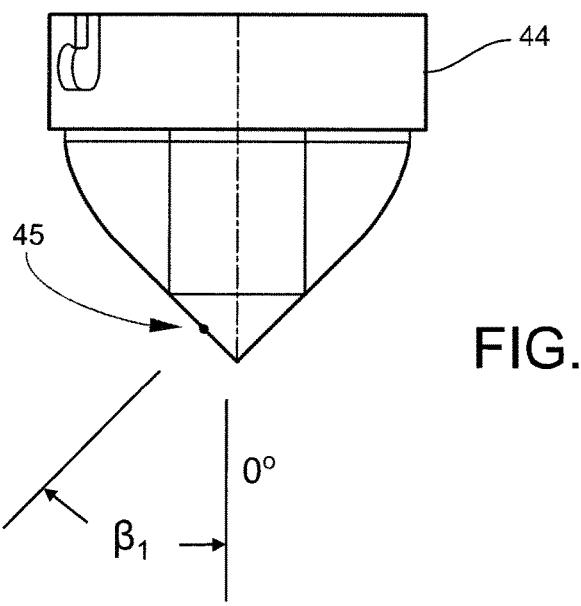
FIG. 17 is a top view of the nozzle of FIG. 16 showing the angle of the nozzle exit opening with respect to the inlet of the nozzle.

Referring to FIGS. 17 and 18, the nozzle may be constructed in the manner shown, wherein the plane of the vertically elongated exit opening 45 is at an angle $\beta_1$ relative to the inlet side of the nozzle, causing the fluid to exit the nozzle at an angle. The desired compound angle, having both a lateral and vertical component, is then created by rotating the nozzle about its central axis by an angle 132, so that the rectangular opening is at an angle to vertical, as shown in FIG. 18. Alternatively, the nozzle may be a configuration in which the exit opening is not angled relative to the inlet side, and the entire nozzle is simply aimed in the desired compound angle direction.

In addition to injecting the cleaning fluid at an angle, the fluid is also injected at a flow rate and velocity selected to achieve the above described current in the parts basket. Flow rate and velocity are related to the pump speed and capacity, and to the size of the nozzle exit. For example, the pumping assembly may be configured to discharge cleaning fluid through the nozzle at a volume flow rate of between about 600 and 1500 cubic centimeters per second (cc/s); and in a more particular embodiment at about 1000 cc/s. The pumping assembly may be further configured to discharge cleaning fluid through the nozzle at a velocity between about 1.5 and 3.5 meters per second (m/s), and more particularly at a velocity of about 2.5 m/s.

The injected fluid stream may also be characterized in terms of its instantaneous momentum. The instantaneous momentum is the product of the mass flow rate and the velocity, or:

$$G=\dot{m}v$$

where G is the instantaneous momentum of the fluid, $\dot{m}$ is the mass flow rate, and v is velocity. Taking the above recited flow rates and velocities, the pumping assembly may be configured in one embodiment to discharge a water based cleaning solution at an instantaneous momentum of between about 1 and 5 kilogram-meters per second squared (kg·m/s$^2$), and in a more specific embodiment at about 2.5 kg·m/s$^2$.

The above listed fluid flow rate, velocity, and momentum parameters are appropriate and may be optimal for use with a parts basket on the order of approximately two cubic foot in volume. A parts basket in which each side wall is 16 inches long by 14 inches high, for example, gives a contained volume of about 2 cubic feet. For a parts basket that is significantly larger or smaller than two cubic feet, an optimal fluid flow rate, velocity, or momentum may be proportionately greater or less than the recited values.

There has been described a novel 3D printed part cleaning apparatus that allows for efficient removal of dissolvable support material without damage to the printed parts. For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A device for removing chemically dissolvable support material from objects created by a three-dimensional printing process, comprising:
    a generally portable cabinet with front, back, and side panels, and an openable lid;
    a tank accessible through the lid and functioning as a watertight liner inside the cabinet, the tank having a cleaning section under the lid, and a fluid handling section in fluid communication with the cleaning section;
    a box shaped parts basket configured to be removably installed within the cleaning section of the tank through the lid, the parts basket having front, back, and side walls that intersect at four corners and are made of fluid impermeable material, wherein the back wall having a single opening for receiving an injected fluid stream, a bottom panel perforated throughout with an array of holes, and an openable top cover, wherein the top cover is below a full level of the tank and the bottom panel of the parts basket is spaced above a floor of the tank when the parts basket is installed in a parts cleaning position; and
    a fluid pump disposed in the fluid handling section of the tank and configured to inject the fluid stream into the parts basket at a predetermined flow rate, velocity, and direction to induce a spiraling, descending fluid current that circulates around an interior of the parts basket as it descends and exits the parts basket through the perforated bottom panel.

2. The device of claim 1, wherein the pump is configured to inject the fluid stream into the parts basket at a downward angle of between about 10 and 20 degrees below horizontal, and at a lateral angle of between about 30 and 65 degrees from a line passing through a center of the parts basket.

3. The device of claim 2, wherein the pump is configured to inject the fluid stream into the parts basket at a downward angle of about 15 degrees below horizontal, and at a lateral angle of about 45 degrees from the line passing through the center of the parts basket.

4. The device of claim 1, wherein the fluid pump is configured to inject the fluid stream into the parts basket at a volume flow rate of between about 600 and 1500 cubic centimeters per second.

5. The device of claim 1, wherein the fluid pump is configured to inject the fluid stream into the parts basket at a volume flow rate of about 1000 cubic centimeters per second.

6. The device of claim 1, wherein the fluid pump is configured to inject the fluid stream into the parts basket at a velocity of between about 1.5 and 3.5 meters per second.

7. The device of claim 6, wherein the fluid pump is configured to inject the fluid stream into the parts basket at an instantaneous momentum of between 1 and 5 kilogram meters per second squared.

8. The device of claim 1, wherein the bottom panel of the parts basket is supported above the bottom surface of the tank by at least four discrete spacers.

9. The device of claim 1, wherein the two corners of the parts basket at the intersection of the front wall and side walls are rounded.

10. The device of claim 9, wherein a ratio of a radius of curvature of the two rounded corners divided by a horizontal length of the side walls of the parts basket is between about 0.1 and 0.3.

11. The device of claim 9, further comprising basket draining features built into an upper end of the tank configured to support the parts basket over the tank with the bottom panel above the full level of the working fluid.

12. The device of claim 11, wherein the basket draining features comprise a pair of integral pegs near the bottom panel of the parts basket extending outward beyond the side walls of the parts basket toward side walls of the tank, and a corresponding pair of flanges attached to the tank near the top of the tank side walls, the flanges providing a recess to receive the pegs and support the parts basket over the tank.

13. The device of claim 1, wherein the lid comprises left and right lid sections hinged to the cabinet side panels.

14. The device of claim 1, wherein the parts basket cover is hinged to a top edge of the parts basket walls.

15. The device of claim 1, wherein the parts basket is made of stainless steel.

16. A device for removing chemically dissolvable support material from objects created by a three-dimensional printing process, comprising:
    a tank for holding a cleaning solution, the tank having a cleaning section and a fluid handling section, and a full level below a top rim thereof;
    a generally box-shaped parts basket configured to be removably installed within the cleaning section of the tank, the parts basket having four walls made of fluid impermeable material, wherein one of the four walls having a single opening for receiving an injected fluid stream, a bottom panel perforated throughout with an array of holes, and an openable top cover, wherein the openable top cover is below the full level of the tank and the bottom panel of the parts basket is supported above a floor of the tank when the parts basket is installed; and
    a fluid pump disposed in a fluid handling section of the tank, the fluid pump configured to inject the fluid stream into the parts basket at a downward angle with respect to horizontal, and at a lateral angle with respect to a line passing through a center of the parts basket, with sufficient velocity and flow rate to induce a fluid current that circulates around an interior of the parts basket as it continuously descends and exits the parts basket through the perforated bottom panel.

17. The device of claim 16, wherein the downward angle is between about 10 and 20 degrees below horizontal, and the lateral angle is between about 30 and 65 degrees from a line passing through the center of the parts basket.

18. The device of claim 17, wherein the fluid pump is configured to inject the fluid stream into the parts basket at a velocity of between about 1.5 and 3.5 meters per second, and a volume flow rate of between about 600 and 1500 cubic centimeters per second.

19. The device of claim 16, wherein the holes in the bottom panel of the parts basket account for between 15 and 60 percent of the total surface area of the bottom panel.

\* \* \* \* \*